US009719703B2

(12) United States Patent
Quisenberry et al.

(10) Patent No.: US 9,719,703 B2
(45) Date of Patent: *Aug. 1, 2017

(54) VEHICLE AIR COMFORT SYSTEM AND METHOD

(71) Applicant: ThermoTek, Inc., Flower Mound, TX (US)

(72) Inventors: Tony Quisenberry, Highland Village, TX (US); Sam K. McSpadden, Austin, TX (US); Christopher Alan Polser, Plano, TX (US); Niran Balachandran, Lewisville, TX (US)

(73) Assignee: ThermoTek, Inc., Flower Mound, TX (US)

( * ) Notice: Subject to any disclaimer, the term of this patent is extended or adjusted under 35 U.S.C. 154(b) by 255 days.

This patent is subject to a terminal disclaimer.

(21) Appl. No.: 14/463,242

(22) Filed: Aug. 19, 2014

(65) Prior Publication Data

US 2014/0352328 A1 Dec. 4, 2014

Related U.S. Application Data

(63) Continuation of application No. 13/864,627, filed on Apr. 17, 2013, now Pat. No. 8,839,633, which is a
(Continued)

(51) Int. Cl.
*F25B 21/02* (2006.01)
*F25B 21/04* (2006.01)
(Continued)

(52) U.S. Cl.
CPC .......... *F25B 21/04* (2013.01); *B60H 1/00478* (2013.01); *B60H 1/2221* (2013.01); *F28D 15/0275* (2013.01); *Y02T 10/88* (2013.01)

(58) Field of Classification Search
CPC .......... F25B 21/02; F25B 21/04; H01L 35/30; B60H 1/00478; B67D 3/009
(Continued)

(56) References Cited

U.S. PATENT DOCUMENTS 2,416,152 A 2/1947 Braun et al.
2,713,655 A 7/1955 Grubman
(Continued)

FOREIGN PATENT DOCUMENTS

DE 3730830 A1 3/1989
DE 4036210 A1 5/1992
(Continued)

OTHER PUBLICATIONS

U.S. Appl. No. 13/250,159, Quisenberry.
(Continued)

*Primary Examiner* — Melvin Jones
(74) *Attorney, Agent, or Firm* — Winstead PC (57) ABSTRACT

Vehicle air comfort systems and methods. The systems and methods may comprise: (1) a plurality of flow tunnels for passage of a heat-transfer fluid; (2) a thermoelectric cooler in thermal communication with the flow tunnels for thermally conditioning the heat-transfer fluid in the flow tunnels; (3) an air inlet for receiving unconditioned air; (4) a thermal exchange assembly for facilitating thermal exchange between the thermally conditioned heat-transfer fluid and the unconditioned air to result in conditioning of the air; and (5) an air outlet for outputting the conditioned air into the vehicle.

20 Claims, 7 Drawing Sheets

Related U.S. Application Data continuation of application No. 12/549,319, filed on Aug. 27, 2009, now Pat. No. 8,443,613.

(60) Provisional application No. 61/092,313, filed on Aug. 27, 2008.

(51) Int. Cl.
  *B60H 1/00* (2006.01)
  *F28D 15/02* (2006.01)
  *B60H 1/22* (2006.01)

(58) Field of Classification Search
  USPC .......................................... 62/3.2, 3.3, 3.61
  See application file for complete search history.

(56) References Cited

U.S. PATENT DOCUMENTS

| | | | |
|---|---|---|---|
| 2,979,923 A | 4/1961 | Bury | |
| 3,040,538 A | 6/1962 | Alsing | |
| 3,087,309 A | 4/1963 | Toulmin, Jr. | |
| 3,088,288 A | 5/1963 | Elfving | |
| 3,138,934 A | 6/1964 | Roane et al. | |
| 3,197,342 A | 7/1965 | Neild | |
| 3,226,602 A | 12/1965 | Elfving | |
| 3,630,272 A | 12/1971 | Kelly | |
| 3,817,043 A | 6/1974 | Zoleta | |
| 4,290,273 A | 9/1981 | Meckler | |
| 4,301,658 A | 11/1981 | Reed | |
| 4,306,613 A | 12/1981 | Christopher | |
| 4,328,677 A | 5/1982 | Meckler | |
| 4,347,474 A | 8/1982 | Brooks et al. | |
| 4,449,576 A | 5/1984 | Baum et al. | |
| 4,463,569 A | 8/1984 | McLarty | |
| 4,478,277 A | 10/1984 | Friedman et al. | |
| 4,490,982 A | 1/1985 | Christmas | |
| 4,631,728 A | 12/1986 | Simons | |
| 4,685,081 A | 8/1987 | Richman | |
| 4,709,323 A | 11/1987 | Lien | |
| 4,718,249 A | 1/1988 | Hanson | |
| 4,955,203 A | 9/1990 | Sundhar | |
| 5,035,052 A | 7/1991 | Suzuki et al. | |
| 5,079,618 A | 1/1992 | Farnworth | |
| 5,097,829 A | 3/1992 | Quisenberry | |
| 5,128,517 A | 7/1992 | Bailey et al. | |
| 5,172,689 A | 12/1992 | Wright | |
| 5,174,121 A | 12/1992 | Miller | |
| 5,190,032 A | 3/1993 | Zacoi | |
| 5,197,291 A | 3/1993 | Levinson | |
| 5,197,294 A | 3/1993 | Galvan et al. | |
| 5,255,520 A | 10/1993 | O'Geary et al. | |
| 5,269,146 A | 12/1993 | Kerner | |
| 5,279,128 A | 1/1994 | Tomatsu et al. | |
| 5,315,830 A | 5/1994 | Doke et al. | |
| 5,361,587 A | 11/1994 | Hoffman | |
| 5,371,665 A | 12/1994 | Quisenberry et al. | |
| 5,450,727 A | 9/1995 | Ramirez et al. | |
| 5,505,046 A | 4/1996 | Nelson et al. | |
| 5,524,439 A | 6/1996 | Gallup et al. | |
| 5,528,485 A | 6/1996 | Devilbiss et al. | |
| 5,561,981 A * | 10/1996 | Quisenberry | F25B 21/02 165/133 |
| 5,588,300 A | 12/1996 | Larsson et al. | |
| 6,029,471 A | 2/2000 | Taylor | |
| 6,058,712 A | 5/2000 | Rajasubramanian et al. | |
| 6,205,805 B1 | 3/2001 | Takahashi et al. | |
| 6,295,819 B1 | 10/2001 | Mathiprakasam et al. | |
| 6,434,955 B1 | 8/2002 | Ng et al. | |
| 6,453,678 B1 | 9/2002 | Sundhar | |
| 6,490,874 B2 | 12/2002 | Chu et al. | |
| 6,591,614 B2 | 7/2003 | Smith et al. | |
| 6,598,405 B2 | 7/2003 | Bell | |
| 6,722,139 B2 | 4/2004 | Moon et al. | |
| 6,880,346 B1 | 4/2005 | Tseng et al. | |
| 6,935,409 B1 | 8/2005 | Parish, IV et al. | |
| 6,978,630 B2 | 12/2005 | Wensink et al. | |
| 7,171,822 B2 | 2/2007 | Allen et al. | |
| 7,237,397 B2 | 7/2007 | Allen | |
| 7,238,101 B2 | 7/2007 | Kadle et al. | |
| 7,240,494 B2 | 7/2007 | Akei et al. | |
| 7,245,494 B2 | 7/2007 | Cheng | |
| 7,246,496 B2 | 7/2007 | Goenka et al. | |
| 7,278,269 B2 * | 10/2007 | Pham | F25B 25/00 62/3.2 |
| 7,296,416 B2 | 11/2007 | Akei et al. | |
| 7,305,843 B2 | 12/2007 | Quisenberry et al. | |
| 7,310,953 B2 | 12/2007 | Pham et al. | |
| 7,370,486 B2 | 5/2008 | Grimm et al. | |
| 7,394,655 B1 | 7/2008 | O'Keeffe | |
| 8,443,613 B2 * | 5/2013 | Quisenberry | B60H 1/00478 62/3.2 |
| 8,839,633 B2 * | 9/2014 | Quisenberry | B60H 1/00478 62/3.2 |
| 2003/0140636 A1 | 7/2003 | Van Winkle | |
| 2004/0250994 A1 | 12/2004 | Chordia | |
| 2006/0034053 A1 | 2/2006 | Parish et al. | |
| 2006/0144073 A1 | 7/2006 | Lee et al. | |
| 2006/0285331 A1 | 12/2006 | Wang et al. | |
| 2007/0101747 A1 | 5/2007 | Eisenhour | |
| 2007/0163270 A1 | 7/2007 | Chien et al. | |
| 2007/0204627 A1 | 9/2007 | Pan | |
| 2008/0006040 A1 | 1/2008 | Peterson et al. | |
| 2008/0028768 A1 | 2/2008 | Goenka | |
| 2008/0110179 A1 | 5/2008 | Rice | |
| 2008/0156034 A1 | 7/2008 | Cur et al. | |
| 2008/0257395 A1 | 10/2008 | Jovanovic et al. | |
| 2010/0050659 A1 | 3/2010 | Quisenberry et al. | |
| 2012/0085105 A1 | 4/2012 | Quisenberry | |

FOREIGN PATENT DOCUMENTS

| | | |
|---|---|---|
| EP | 0478204 A2 | 4/1992 |
| GB | 2164135 A | 3/1986 |
| GB | 2174792 A | 11/1986 |
| GB | 2250337 A | 6/1992 |
| GB | 2260191 A | 4/1993 |
| JP | 57138415 A | 8/1982 |
| JP | 57188855 A | 11/1982 |
| JP | 7-106640 A | 4/1995 |
| JP | 8136422 A | 5/1996 |
| WO | WO-99/10191 A1 | 3/1999 |

OTHER PUBLICATIONS

U.S. Appl. No. 13/864,627, Quisenberry et al.
Solar Panels Plus, "Yazaki Aroace Solar Air Conditions: Solar Powered Absorption Chillers and Heating", http://www.solarpanelsplus.com/yazaki-solar-HVAC/, May 26, 2010, (1 page).
Cooling Mode, http://www.eurocooling.com/public_html/articleseagroup_file/image008.jpg, Mar. 4, 2010, (1 page).
Absorption Refrigerator, http://en.wikipedia.org/wiki/Gas_absorption_refrigerator, Mar. 4, 2010, (5 pages).
Refrigeration, http://en.wikipedia.org/wiki/Refrigeration, Mar. 1, 2010, (10 pages).
Young, Lee W., "International Search Report" for PCT/US11/54278 as mailed Feb. 29, 2012, 3 pages.

* cited by examiner

VEHICLE AIR COMFORT SYSTEM AND METHOD

RELATED APPLICATIONS

The present application is a continuation of U.S. patent application Ser. No. 13/864,627, filed Apr. 17, 2013. U.S. patent application Ser. No. 13/864,627 is a continuation of U.S. patent application Ser. No. 12/549,319, filed Aug. 27, 2009. U.S. patent application Ser. No. 12/549,319 claims priority to U.S. Provisional Patent Application No. 61/092,313, filed on Aug. 27, 2008. U.S. patent application Ser. No. 13/864,627, U.S. patent application Ser. No. 12/549,319, and U.S. Provisional Patent Application No. 61/092,313 are incorporated by reference in their entirety.

BACKGROUND

Technical Field

The present invention relates to air conditioning systems and methods, and more particularly, but not by way of limitation, to temperature control assemblies and methods for selective temperature control of enclosures, such as a passenger compartment of a vehicle.

History of Related Art

Temperature control systems such as vehicle heaters and air conditioners have improved in recent years. Most common in the transportation industry today are compressor based air-conditioning units that use power from the engine to drive the compressor. When the engine is idling, running the A/C unit may require the engine to idle at higher RPM's. Idling the engine at higher RPM's, however, causes an increase in noise, fuel consumption, and pollution. Furthermore, high fuel prices make it desirable to turn the vehicle's engine off when the vehicle is parked for extended periods of time. In order to run a compressor-based A/C unit while the engine is off, power from the vehicle's battery power is generally needed. Such battery use can, however, only be continued for a short period of time before the battery is completely emptied.

Federal and local regulations have exacerbated the problems associated with the above-mentioned issues. For environmental reasons, vehicles parked at truck stops are often only allowed to idle for a limited period of time. In certain instances, this time is as little as only a few minutes. Unfortunately, vehicle drivers are often required to stay overnight at truck stops or the likes for a myriad of reasons. One reason may be that the driver reaches the maximum number of operating hours allowed by company policy or other regulations. Another reason may be that the driver becomes too tired to continue driving safely.

It is well known that many of commercial drivers choose to sleep in their respective vehicles while parked at truck stops or other rest areas. Whether during the day or overnight, the temperature outside may be too hot to comfortably sleep without air conditioning. In those situations, it would be desirable to have a vehicle air-conditioning unit capable of cooling an interior of the vehicle without running the vehicle's engine. It is also critical that any better power consumption will not drain the vehicle's battery below the minimum level required to start the vehicle the next day.

It should also be noted that the temperature outside the vehicle may also be too low for the driver to sleep comfortably in the vehicle without having a heater running. In those situations, it would be desirable to have a heating unit capable of heating an interior of the vehicle without requiring the vehicle's engine to be running. It would also be desirable for the heating unit to heat the interior of the vehicle in such a way that the vehicle's battery is not drained below the minimum level required to start the vehicle.

SUMMARY OF THE INVENTION

The present invention relates to vehicle air comfort systems and methods. More particularly, one aspect of the present invention includes vehicle air comfort systems and methods which may be used to cool or heat unconditioned air in an efficient and environmentally friendly manner.

In some embodiments, a vehicle air comfort system is provided that comprises a plurality of flow tunnels for passage of a heat-transfer fluid. The vehicle air comfort systems may also comprise a thermoelectric cooler that is in thermal communication with the flow tunnels and operable to thermally condition the heat-transfer fluid in the flow tunnels. The system may further comprise an air inlet for receiving unconditioned air. In addition, the system may comprise a thermal exchange assembly that is operable to facilitate thermal exchange between the thermally conditioned heat-transfer fluid and the unconditioned air in order to condition the air. The system may also comprise an air outlet for outputting the conditioned air into a vehicle. In various embodiments, conditioning may comprise cooling or heating the unconditioned air.

In other embodiments, vehicle air comfort systems of the present invention may further comprise a plurality of fins that are operable to dissipate thermal energy from the thermoelectric cooler. Likewise, the vehicle air comfort systems in some embodiments may comprise a thermoelectric cooler exhaust for outputting dissipated thermal energy from the thermoelectric cooler.

In some embodiments, the thermal exchange assembly may be a radiator. In some embodiments, the thermal exchange assembly may comprise a fluid inlet for receiving thermally conditioned heat transfer fluid, a body for facilitating thermal exchange between the thermally conditioned heat transfer fluid and the unconditioned air, and a fluid outlet for outputting the heat transfer fluid after the thermal exchange.

In additional embodiments, vehicle air comfort systems may comprise a tubing network that is operable to place the heat transfer assembly in fluid communication with the thermal exchange assembly. In some embodiments, the tubing network may be a closed-loop circuit. In additional embodiments, the tubing network may comprise a pump for facilitating the passage of the heat-transfer fluid. In various embodiments, the heat transfer fluid may be a coolant.

In some embodiments, vehicle air comfort systems may further comprise one or more fans for facilitating the movement of conditioned or unconditioned air. In some embodiments, the vehicle air comfort systems may comprise a pre-cool unit for pre-cooling the unconditioned air. The vehicle air comfort systems of the present invention may also comprise one or more filter units for filtering the conditioned or unconditioned air. Similarly, the vehicle air comfort systems may comprise an evaporator unit for humidifying the conditioned or unconditioned air.

In additional embodiments, vehicle air comfort systems may also comprise one or more sensors for monitoring one or more operating conditions associated with the system. Vehicle air comfort systems of the present invention may also comprise a user interface for monitoring and/or controlling one or more operating conditions associated with the system.

Other embodiments of the present invention include methods for conditioning the air of a vehicle by the vehicle air conditioning systems of the present invention. In some embodiments, the methods may comprise: (1) passing a heat transfer fluid through the plurality of flow tunnels of the vehicle air comfort system; (2) thermally conditioning the heat-transfer fluid in the flow tunnels by the use of thermoelectric coolers; (3) passing the thermally conditioned heat transfer fluid and unconditioned air through the thermal exchange assembly, wherein the passing results in thermal exchange between the heat transfer fluid and the unconditioned air, and wherein the thermal exchange results in the conditioning of the unconditioned air; and (4) outputting the conditioned air through the air outlet.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE

Embodiments of the Invention

In accordance with one aspect of the invention, methods and systems that provide a substantially emission-free solution and afford a comfortable environment inside an enclosure, such as, for example, inside a parked vehicle. More specifically, in accordance with other aspects of the invention, the present invention provides numerous vehicle air comfort systems and methods to condition the air inside a vehicle.

In some embodiments, the vehicle air comfort systems and methods of the present invention can be used to condition the air inside a truck, such as Class 7 sleeper trucks or Class 8 day cab trucks. In other embodiments, the vehicle air comfort systems and methods of the present invention may be used to condition the air inside a tractor-trailer. In more specific embodiments, the vehicle air comfort systems and methods of the present invention can be used to condition the air in a cabin or a sleeping space of a vehicle.

The vehicle air comfort systems of the present invention can be powered by numerous sources, such as by the vehicle's battery unit, or by a power supply independent of the vehicle's battery unit. In other embodiments, the systems can be powered by solar energy. In more specific embodiments, the systems may be powered by utilizing Lead-Acid or Lithium-Ion batteries as the energy source.

In a first example, a vehicle air comfort system of the present invention, as discussed in more detail below, may comprise: (1) an air inlet, such as a return air compartment, for receiving unconditioned air; (2) a plurality of flow tunnels for passage of the unconditioned air; (3) a thermoelectric cooler (TEC) in thermal communication with the flow tunnels for conditioning the passing unconditioned air; and (4) an air outlet, such as a vent, for outputting the conditioned air into a vehicle. However, as will be understood by one skilled in the art, the order and arrangement of the above-mentioned vehicle air comfort system components may be varied while still accomplishing the goal of conditioning the air. Likewise, in additional embodiments, one or more of the above-mentioned components may be entirely absent while sill accomplishing the goal of conditioning the air.

In some embodiments, conditioning entails cooling the unconditioned air. This can occur by the removal of heat from the flow tunnels by the thermoelectric cooler(s) that are in thermal communication with them. In additional embodiments, conditioning entails heating the unconditioned air, which can occur by the addition of heat to the flow tunnels by the thermoelectric cooler(s).

In other embodiments, vehicle air comfort systems may include additional components. For instance, in some embodiments, a vehicle air comfort system can comprise a plurality of thermoelectric coolers that are in thermal communication with the flow tunnels. In additional embodiments, the system can comprise a plurality of fins that are operable to dissipate thermal energy from the thermoelectric coolers. Vehicle air comfort systems can also comprise a thermoelectric cooler exhaust for outputting dissipated thermal energy from the thermoelectric cooler. In other embodiments, the vehicle air comfort systems can comprise one or more fans that are operable to move conditioned or unconditioned air within a system. For instance, the fans may be speed-controlled fans to push and/or pull air across a system.

In additional embodiments, a vehicle air comfort system can further comprise a pre-cool unit for pre-cooling the unconditioned air before the conditioning occurs. In other embodiments, a vehicle air comfort system can comprise one or more filter units for filtering the conditioned and/or unconditioned air, a water pumping unit to add water to filter units, and/or an evaporator unit for humidifying the conditioned or unconditioned air.

In additional embodiments, a vehicle air comfort system can further comprise one or more sensors for monitoring one or more conditions that are associated with a system. For instance, sensors may exist for monitoring conditions such as the temperature of the unconditioned air, the temperature of the conditioned air, the humidity of the conditioned air, and/or the humidity of the unconditioned air. In additional embodiments, the vehicle air comfort system can also comprise a user interface that is operable to display the monitored conditions to a user. In additional embodiments, a user interface may enable a user to control the monitored conditions. In further embodiments, a controller may control the monitored conditions automatically.

Figure 1:
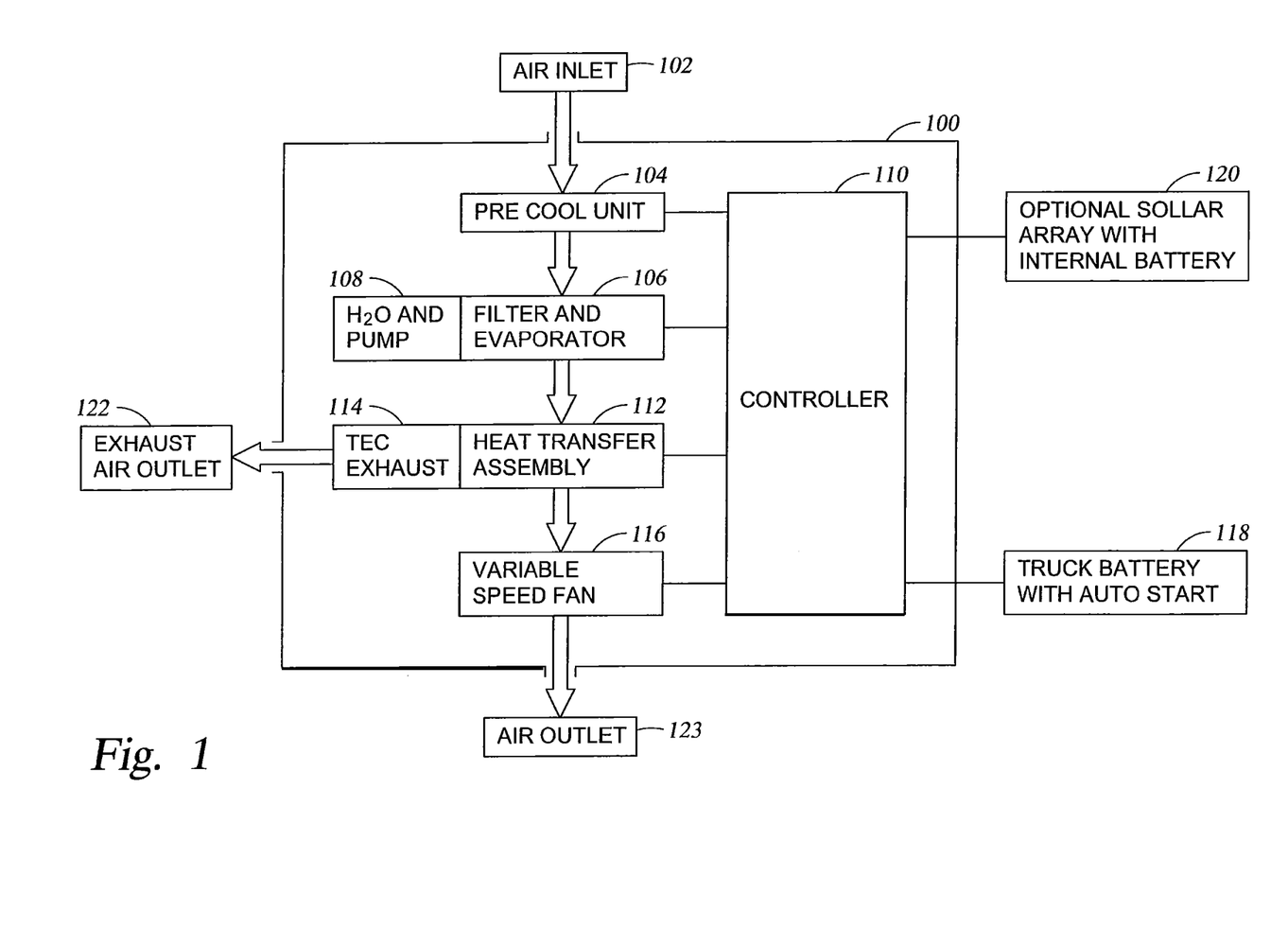
FIG. 1 is a block diagram of an air comfort system in accordance with one embodiment of the present invention.

Referring now to the drawings, FIG. 1 is a block diagram of an air comfort system 100 adapted to cool the inside of an enclosure, such as, for example, a cabin and/or sleeping space of a tractor-trailer according to one embodiment. The air comfort system 100 generally comprises air inlet 102, pre-cool unit 104, filter and evaporator 106, water and pump 108, controller 110, heat transfer assembly 112, TEC exhaust 114, exhaust air outlet 122, variable speed fan 116, and air outlet 123. As discussed in more detail below, heat transfer assembly 112 in one embodiment may comprise the components shown in FIG. 3, including a plurality of fins 306, a plurality of thermoelectric coolers 302, and a plurality of flow tunnels 304.

Referring again to FIG. 1, air comfort system 100 is adapted to receive air via air inlet 102. The air passing through air inlet 102 may be air from either inside or outside the enclosure or a combination of the two. As will be explained in more detail below, the air may pass through a pre-cool unit 104 before going to a filter 106. Furthermore, as will be understood by one skilled in the art, the order in which the air is passed through the various modules of the air comfort system 100 may be varied while still accomplishing the goal of conditioning the air by either cooling or heating the air.

As shown in FIG. 1, the air comfort system 100 includes a variable speed fan 116 to pull air through the system 100. However, it is also contemplated that one or more variable speed fans 116 may be disposed at various locations in or around the system 100 in order to move the air. The variable-speed fans 116 may be utilized to either push the air through the system 100, pull the air through the system 100, or a combination of pushing and pulling the air through the system 100. In the embodiment shown, the air passes through a module 106 comprising a combination filter and evaporator before passing to a heat transfer assembly 112. In various embodiments, the module 106 may be only a filter, only an evaporator, both or may be neither. The filter of module 106 may help remove dirt, debris, allergens, and/or other contaminants from the air passing therethrough. The evaporator of module 106 may be a mist membrane that humidifies the air. In the embodiment shown, a pump 108 is used to deliver water from an $H_2O$ or other fluid reservoir to the mist membrane to increase the humidity of the air passing therethrough. In addition, a humidity sensor may be utilized to monitor the humidity of the air either before the mist membrane, after the mist membrane, or both. A determination may then be made as to whether the humidity of the air should be increased and/or whether evaporative cooling may be utilized to increase the efficiency of cooling the ambient air.

In the embodiment shown in FIG. 1, after the air passes through the filter and evaporator module 106, the air is then passed through the heat transfer assembly 112. As will be explained in more detail below, the heat transfer assembly 112 may include a plurality of flow tunnels with multiple fins on both an inside and an outside section thereof. The inside fins may produce a controlled temperature flow that is passed through the air outlet 123 via the variable speed fan 116. The outside fins may pass the opposite thermal flow of air to a TEC exhaust 114 to the exhaust air 122. In some embodiments, the system may produce the controlled temperature by either heating an ambient temperature or cooling an ambient temperature.

In various embodiments, a plurality of sensors may be utilized to monitor various aspects of the system 100 and/or the environment. For example, in various embodiments, the system 100 may have a controller 110 containing one or more processors adapted to receive a plurality of signals from one or more of the plurality of sensors. The sensors may be disposed so as to monitor the temperature inside the enclosed space, the temperature outside the enclosed space, the humidity of the air, the battery power, and/or any other aspect that may need to be monitored to ensure a comfortable environment inside the enclosed space. In some embodiments, the system 100 has a user interface in which a user can manually set and adjust a desired temperature. In some embodiments, the user interface may include a display and interface located on the system 100 and/or a user interface remotely disposed from the system 100 where the remotely disposed interface may be coupled to the system 100 via a wired link and/or a wireless link.

In various embodiments, the heat transfer assembly 112 heats or cools the air passing there across using a plurality of TECs. The temperature of the TECs may be controlled by controller 110 utilizing a pulse-width modulation and/or voltage variance in a manner adapted to reduce power consumption. In some embodiments, the system 100 may be powered from the vehicle's battery unit 118. Some embodiments may contain an alarm or auto-start function to prevent the battery 118 from discharging beyond truck-cranking capability. In some embodiments, the system 100 may be powered from a power supply independent of the vehicle's battery. In some embodiments, the system may utilize a solar array 120 to use and/or store solar energy. The solar array 120 may have an internal battery to maximize the solar energy available for use. In various embodiments, the system 100 may store energy for later use by cooling a phase-change medium disposed in an insulated unit, such as, for example, an ice tank. Thereafter, air may be cooled using this stored cooling prior to being used to cool the enclosed space either with or without additional cooling.

Figure 2:
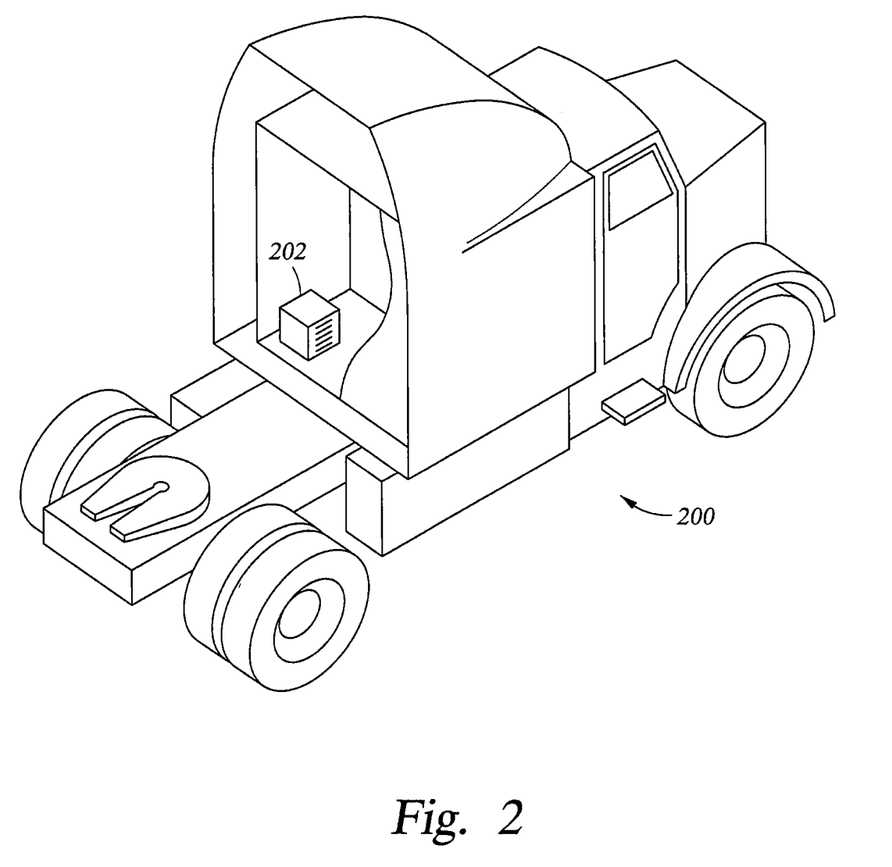
FIG. 2 is an illustration of one example of a vehicle using an air comfort system in accordance with one embodiment of the present invention.

Referring now to FIG. 2, a cutaway view of a tractor-trailer 200 is shown. An air comfort system 202 is shown disposed inside a sleeping area of the tractor-trailer 200. The system 202 has vents for dispersing the conditioned air within the enclosed area and also has a vent coupled to an area outside the tractor-trailer for dispersing the exhaust air outside the enclosed area. The size, shape, location and other characteristics of the system 202 are only for exemplary purposes and can be varied substantially without departing from the contemplated scope of the invention.

Figure 3:
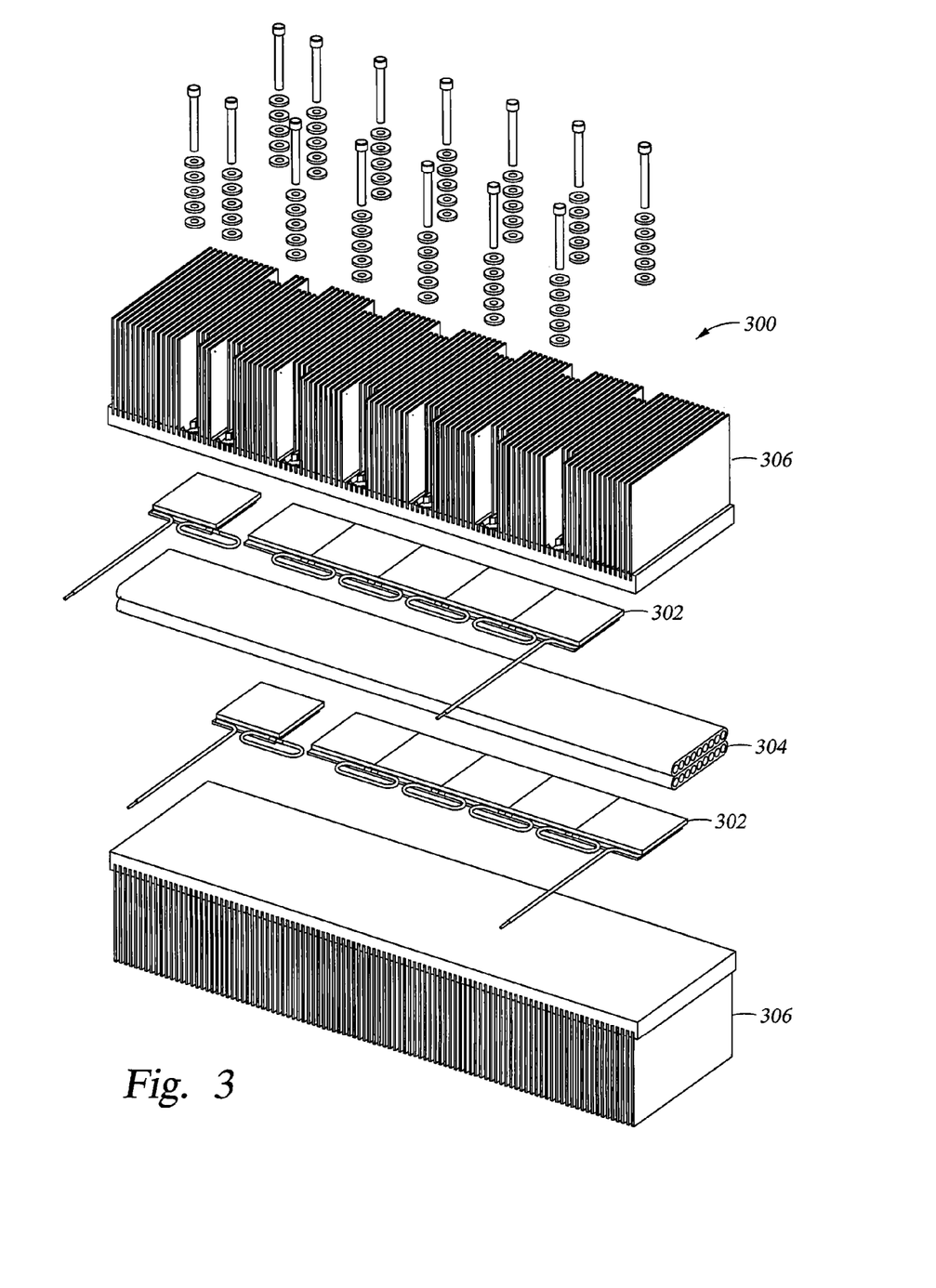
FIG. 3 is an exploded view of a heat transfer assembly in accordance with one embodiment of the present invention.

Referring now to FIG. 3, an exploded view of one embodiment of a heat transfer assembly 300 can be seen. In the embodiment shown, a plurality of flow tunnels 304 adapted for air to pass therethrough can be seen. On opposite sides of the flow tunnels 304, a plurality of TECs 302 can be seen. In the embodiment shown, the TECs 302 are in thermal communication with the flow tunnels 304. In addition, on the sides of the TECs 302 opposite of the flow tunnels 304, a plurality of fins 306 can be seen. When the heat transfer assembly 300 is being utilized to cool air passing through the flow tunnels 304, electricity is run through the TECs 302 to remove heat from the flow tunnels 304. Similarly, when the Heat transfer assembly 300 is being utilized to heat air passing through the flow tunnels 304, electricity is run through the TECs 302 to add heat to the flow tunnels 304. In either mode of operation, the plurality of fins 306 are adapted to dissipate thermal energy from the TECs 302, as needed.

Applicants note that FIG. 3 shows an arrangement of only one embodiment of a heat transfer assembly that is suitable for the present invention. In additional embodiments, and as discussed in more detail below, heat transfer assemblies of the present invention may be associated with one or more heat pipes for removing heat, such as the heat pipes described and disclosed in U.S. Pat. No. 6,935,409. Applicants further note that several other arrangements of heat transfer assemblies are contemplated, such as the arrangements described in U.S. Pat. No. 7,305,843 and U.S. Pub. Pat. App. No. 2006/0034053. The above-mentioned references have been assigned to the assignees of the present application and are incorporated herein by reference in their entirety.

In a second example, the present disclosure provides additional vehicle air comfort systems and methods. As will be discussed in more detail below, the vehicle air conditioning systems in the second example can incorporate various components of the vehicle air conditioning systems of the first example described above. With reference to air comfort system 400 shown in FIG. 4 for illustrative purposes, air comfort systems in the second example can comprise an air inlet 416 for receiving unconditioned air 418, a heat transfer assembly 402 for thermally conditioning an unconditioned heat transfer fluid 428 (shown here in tubing network 412 as discussed below), and a thermal exchange assembly 422 for facilitating thermal exchange between the thermally conditioned heat-transfer fluid 421 and unconditioned air 418. The thermal exchange results in the conditioning of the air, such as by heating or cooling. For instance, if the heat transfer fluid has been cooled during the thermal conditioning, the heat exchange results in the transfer of heat from the unconditioned air to the heat transfer fluid to result in the cooling of the air. Likewise, if the heat transfer fluid has been heated during thermal conditioning, the thermal exchange results in the transfer of heat from the heat transfer fluid to the unconditioned air to result in the heating of the air.

Figure 4:
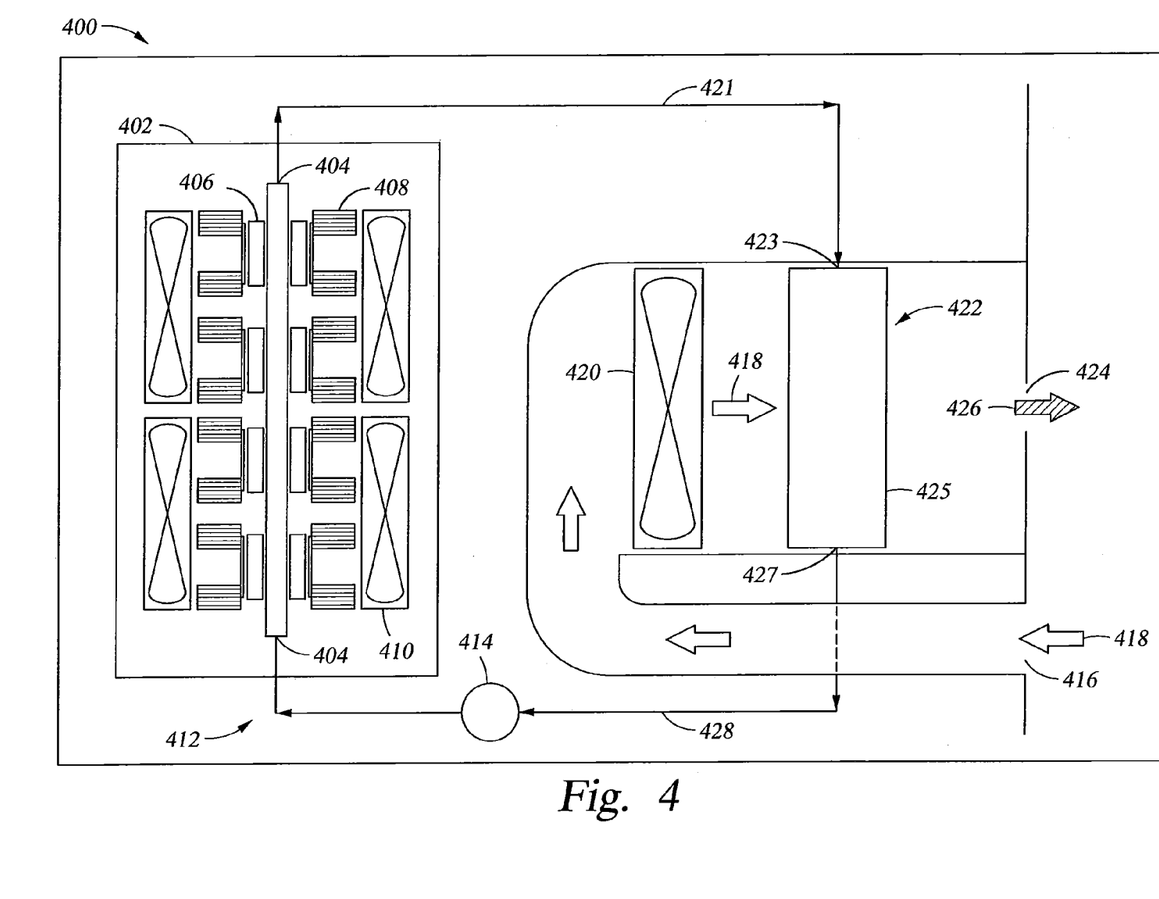
FIG. 4 is a block diagram of an air comfort system in accordance with one embodiment of the present invention.

As shown in the embodiment in FIG. 4, vehicle air comfort systems in accordance with the second example may also contain an air outlet 424, such as a vent, for outputting the conditioned air into a vehicle. In addition, the systems may contain a tubing network 412 for placing heat transfer assembly 402 in fluid communication with thermal exchange assembly 422.

In the embodiment shown in FIG. 4, tubing network 412 is a closed-loop circuit. In addition, tubing network 412 comprises a pump 414 for facilitating the passage of the heat-transfer fluid through system 400. However, other suitable tubing networks can also be envisioned by people of ordinary skill in the art.

Similarly, various heat transfer fluids may be used in the vehicle air comfort systems of the present invention. For instance, in some embodiments, the heat-transfer fluid can be a coolant. In other embodiments, the heat transfer fluid can be water. Other suitable heat transfer fluids may also be envisioned by people of ordinary skill in the art.

Referring again to FIG. 4, heat transfer assembly 402 comprises a plurality of flow tunnels 404, thermoelectric coolers 406 that are in thermal communication with the flow tunnels, fins 408 for dissipating thermal energy from the TEC's, and fans 410 for facilitating the movement of air. However, as will be understood by one skilled in the art, the order and arrangement of the above-mentioned heat transfer assembly components may be varied. Furthermore, in additional embodiments, one or more of the above-mentioned components may be entirely absent. In other embodiments, heat transfer assembly 402 may resemble heat transfer assembly 300 shown in FIG. 3. In further embodiments, heat transfer assembly 402 may resemble the heat transfer assemblies described and disclosed in U.S. Pat. No. 7,305,843 and U.S. Pub. Pat. App. No. 2006/0034053. In additional embodiments, and as discussed in more detail below, heat transfer assembly 402 may be associated with one or more heat pipes for removing heat, such as the heat pipes described and disclosed in U.S. Pat. No. 6,935,409.

Various thermal exchange assemblies may also be used with the vehicle air comfort systems of the present invention. For instance, and with reference again to FIG. 4 for illustrative purposes, thermal exchange assembly 422 may comprise a fluid inlet 423 for receiving thermally conditioned heat transfer fluid 421, body 425 for facilitating thermal exchange between the heat transfer fluid 421 and unconditioned air 418, and fluid outlet 427 for outputting the heat transfer fluid after the heat exchange.

In some embodiments, the thermal exchange assembly may be a radiator. In other embodiments, the thermal exchange assembly may be a heat pipe, such as a heat pipe described and disclosed in U.S. Pat. No. 6,935,409. In other embodiments, the thermal exchange assembly may constitute one or more components of a heat transfer assembly, such heat transfer assembly 300 shown in FIG. 3, heat transfer assembly 402 shown in FIG. 4, or one or more of the heat transfer assemblies described and disclosed in U.S. Pat. No. 7,305,843 and U.S. Pub. Pat. App. No. 2006/0034053. In further embodiments, and as will be discussed in more detail below, thermal exchange assemblies may be associated with a dehumidifier for dehumidifying the conditioned or unconditioned air.

In the embodiment shown in FIG. 4, a fan 420 is also in proximity to thermal exchange assembly 422 for facilitating the thermal exchange between the air and the thermal exchange fluid. However, in other embodiments, more fans may be present to facilitate such thermal exchange. In other embodiments, no fans may be present at all.

Vehicle air comfort systems in accordance with the second example described above have various modes of operation. For instance, in some embodiments, and with reference again to system 400 in FIG. 4, thermally unconditioned heat transfer fluid 428 in tubing network 412 first passes through flow tunnels 404. The heat transfer fluid is then thermally conditioned in the flow tunnels by the thermoelectric coolers 406. Next, the thermally conditioned heat transfer fluid 421 enters thermal exchange assembly 422 through fluid inlet 423. At the same time, unconditioned air 418 enters the system 400 through air inlet 416 and passes through thermal exchange assembly 422. The simultaneous flow of unconditioned air and thermally conditioned heat transfer fluid through thermal exchange assembly 422 results in thermal exchange between the heat transfer fluid and the unconditioned air. Consequently, the thermal exchange results in the conditioning of the unconditioned air. Thereafter, conditioned air 426 exits system 400 through air outlet 424.

In the embodiment shown in FIG. 4, tubing network 412 helps pass the heat-transfer fluid through the heat transfer assembly 402 and thermal exchange assembly 422. In addition, fan 420 facilitates the passing of the unconditioned air through the thermal exchange assembly 422. In the embodiment shown, fan 420 may also facilitate the outputting of the conditioned air 426 from system 400.

In some embodiments, air comfort systems of the present invention can cool unconditioned air. In such embodiments, the thermal conditioning of the heat transfer fluid entails the cooling of the heat-transfer fluid. This can occur through the extraction of heat from the flow tunnels by the TEC's (as previously described) as the heat transfer fluid passes through the flow tunnels. Similarly, in such embodiments, the thermal exchange entails the transfer of heat from the unconditioned air to the cooled heat transfer fluid to result in the cooling of the unconditioned air.

In other embodiments, air comfort systems of the present invention can heat unconditioned air. In such embodiments, the thermal conditioning of the heat transfer fluid entails the heating of the heat-transfer fluid. Such heating can occur by the addition of heat to the flow tunnels by the thermoelectric coolers (as previously described) as the heat transfer fluid passes through the flow tunnels. Similarly, in such embodiments, the thermal exchange entails the transfer of heat from the heat transfer fluid to the unconditioned air to result in the heating of the unconditioned air.

The conditioning of air by the use of the vehicle air comfort systems of the second example can also be in response to one or more monitored conditions, as previously described. Likewise, as described previously, such monitoring can occur by one or more sensors that may be detectable on a user interface.

As will be understood by one skilled in the art, the order and arrangement of the above-mentioned steps may be varied while still accomplishing the goals of the present invention. Likewise, in additional embodiments, one or more of the above-mentioned steps may be entirely absent while sill accomplishing the goals of the present invention.

Furthermore, as will be understood by one skilled in the art, the order and arrangement of the above-mentioned components of a vehicle air comfort system in accordance with the second example depicted in FIG. 4 may be varied while still accomplishing the goals of the present invention. In particular, in additional embodiments, one or more of the above-mentioned components may be entirely absent. For instance, in some embodiments, and as previously described and shown in FIG. 1, the vehicle air comfort systems in the second example may contain a thermoelectric cooler exhaust for outputting dissipated thermal energy from the thermoelectric cooler. Likewise, the vehicle air comfort systems of the second example may also include one or more sensors for monitoring one or more operating conditions associated with the system. For instance, the vehicle air comfort systems may comprise sensors that monitor the temperature of the unconditioned heat transfer fluid, the temperature of the conditioned heat transfer fluid, the temperature of the unconditioned air, the temperature of the conditioned air, the humidity of the conditioned air, and/or the humidity of the unconditioned air. Similarly, the vehicle air comfort systems of the second example can also comprise a user interface and/or a controller as previously described and shown in FIG. 1.

Figure 5:
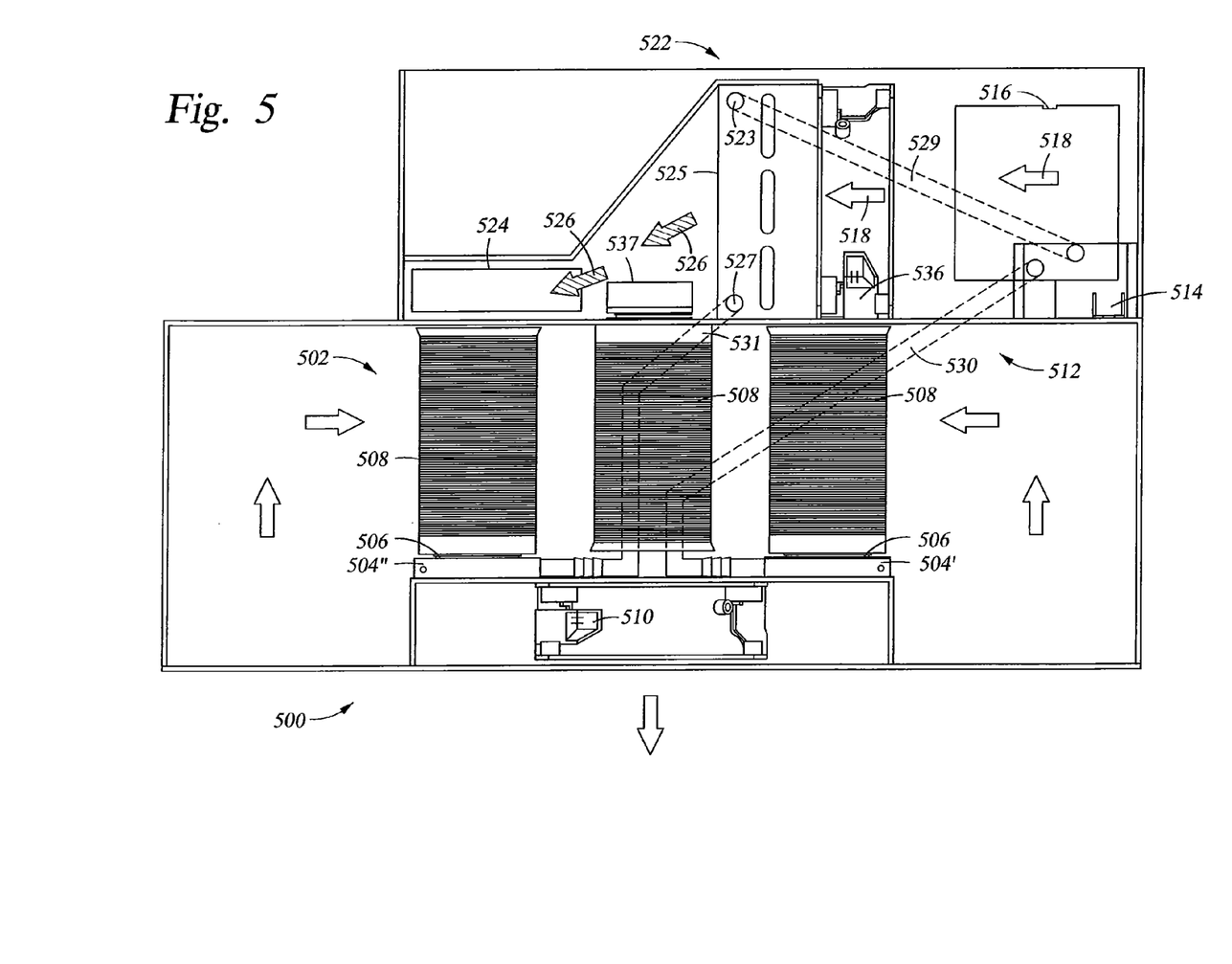
FIG. 5 is a cross-section view of an air comfort system in accordance with one embodiment of the present invention.

The broad scope of vehicle air comfort systems in accordance with the second example of the present invention can be further illustrated by reference to FIGS. 5-7. In particular FIG. 5 depicts vehicle air comfort system 500 with air inlet 516, thermal exchange assembly 522, heat transfer assembly 502, and air outlet 524. The system also contains fan 536 and dehumidifier 537. In addition, vehicle air comfort system 500 contains tubing network 512 for placing heat transfer assembly 502 in fluid communication with thermal exchange assembly 522.

In the embodiment shown in FIG. 5, tubing network 512 is also a closed-loop circuit with a plurality of tubes (i.e., tubes 529, 530, 531 and additional tubes not shown). In addition, tubing network 512 in this embodiment contains a pump 514 for facilitating the fluid communication between thermal exchange assembly 522 and heat transfer assembly 502.

In the embodiment shown in FIG. 5, thermal exchange assembly 522 also contains a fluid inlet 523, a body 525, and a fluid outlet 527. Thermal exchange assembly 522 is also in close proximity to fan 536 and dehumidifier 537.

Figure 6:
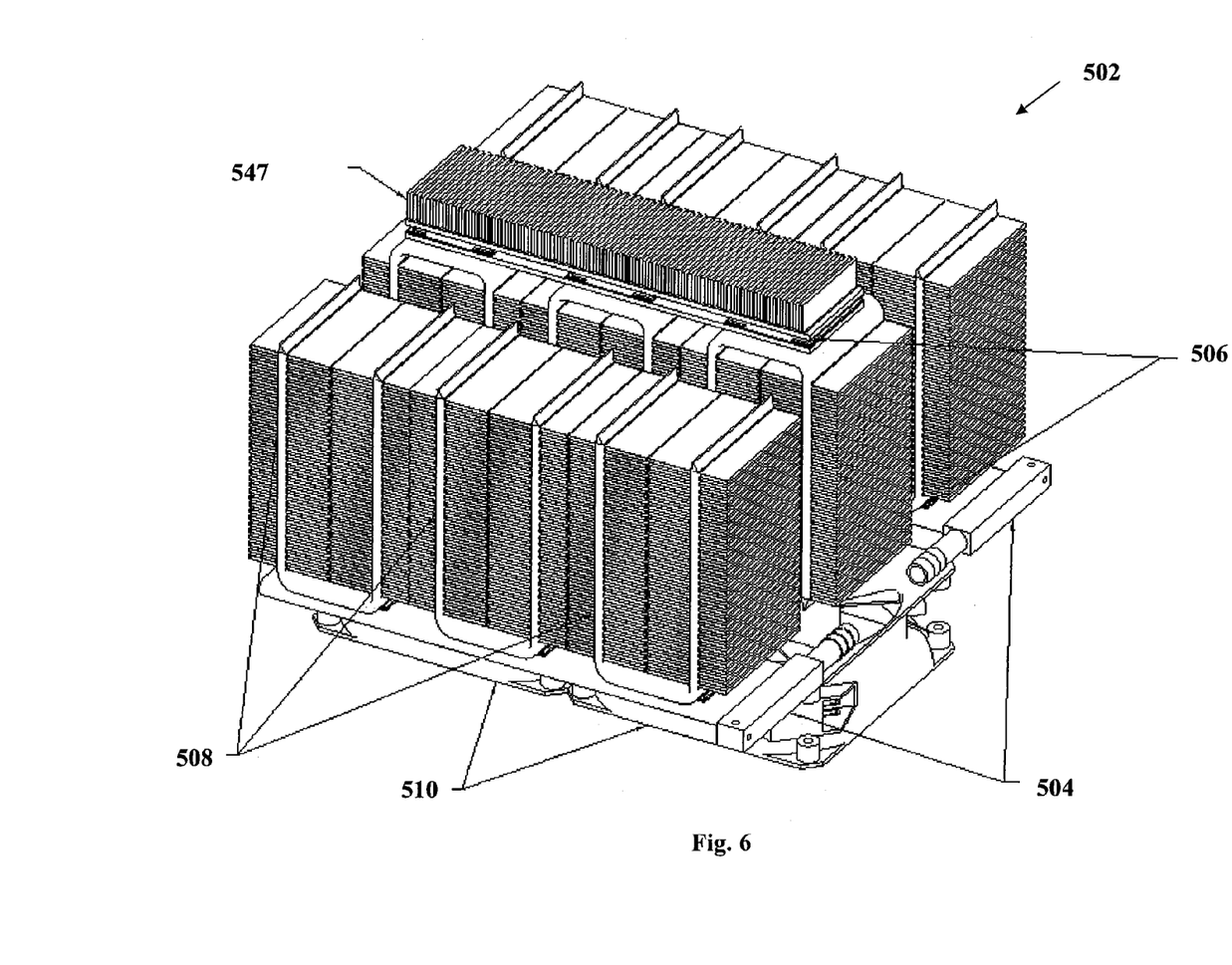
FIG. 6 is a cross-section view of the dehumidifier shown in FIG. 5.

Turning now to FIG. 6, a more detailed illustration of dehumidifier 537 is shown. In particular, dehumidifier 537 in this embodiment contains filter unit 540 and fan 542. However, in other embodiments, a dehumidifier may not contain a fan. Other suitable dehumidifiers may also be envisioned by persons of ordinary skill in the art.

Referring again to FIG. 5, heat transfer assembly 502 in system 500 is shown to contain two sets of a plurality of flow tunnels 504 (504' and 504") that are in thermal communication with thermoelectric coolers 506. Heat transfer assembly 502 also contains fins 508 and fan 510. A side view of heat transfer assembly 502 in FIG. 7 also shows that the heat transfer assembly in this embodiment is associated with additional fans 510 and thermoelectric coolers 506. Heat transfer assembly 502 in this embodiment is also associated with dehumidifier 737 and heat pipes 550.

Figure 7:
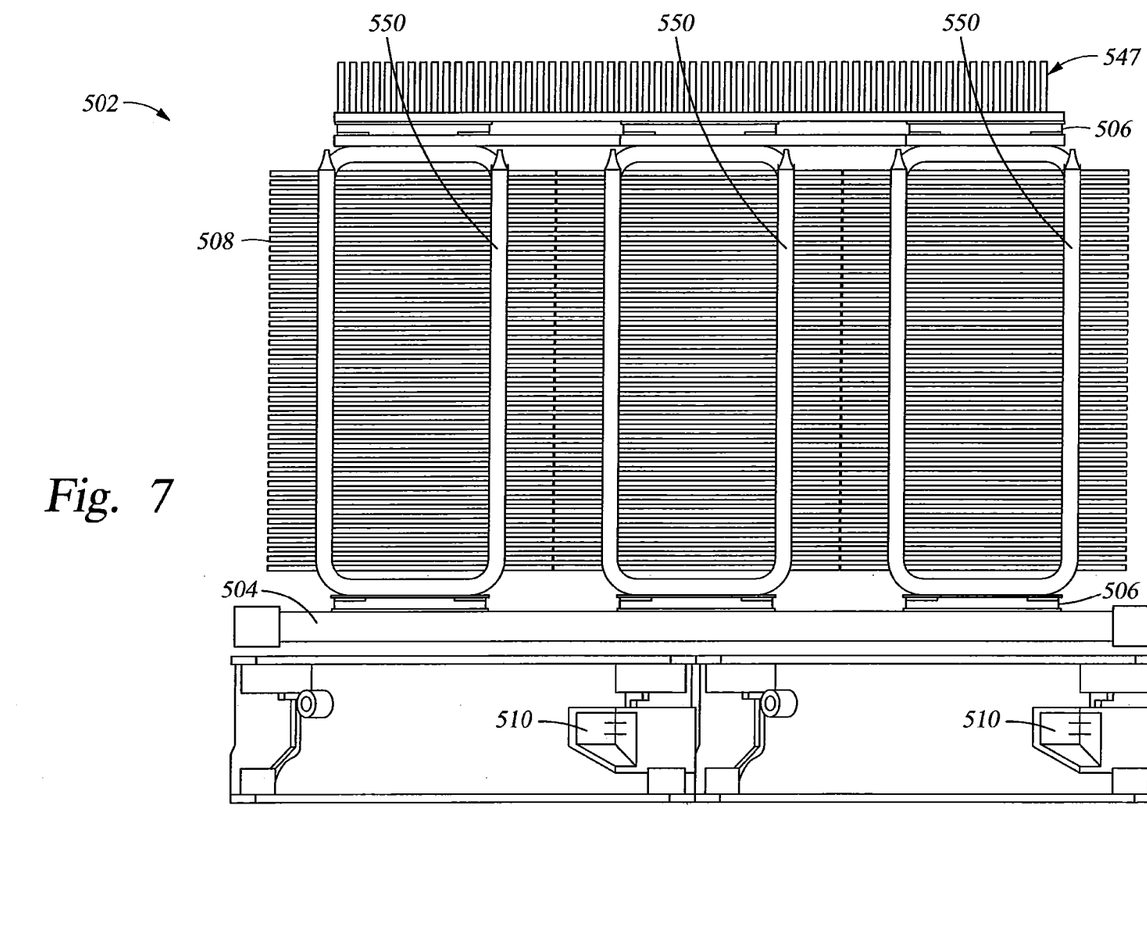
FIG. 7 is a side view of the heat transfer assembly shown in FIG. 5.

Vehicle air comfort system 500 shown in FIGS. 5-7 can also have various modes of operation. For instance, in one embodiment, flow tunnels 504' and 504" receive thermally unconditioned heat transfer fluid from the tubes in tubing network 512. Thereafter, thermoelectric coolers 506 facilitate the thermal conditioning of the heat transfer fluid as it passes through the flow tunnels. Next, the heat transfer fluid passes through thermal exchange assembly 522 as previously described. At the same time, unconditioned air 518 enters system 500 through air inlet 516 and passes through thermal exchange assembly 522. This results in thermal exchange between the heat transfer fluid and the unconditioned air, and the conditioning of the air. Thereafter, conditioned air 526 exits system 500 through air outlet 524. Before exiting the system, conditioned air 526 may come into contact with dehumidifier 537. Such contact may result in the dehumidification of the conditioned air before it exits the system. Furthermore, and as previously discussed, fan 536 may facilitate the thermal exchange process.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A vehicle air comfort system comprising:
   a plurality of flow tunnels for passage of a heat-transfer fluid;
   a thermoelectric cooler in thermal communication with the flow tunnels, wherein the thermoelectric cooler is operable to thermally condition the heat-transfer fluid in the flow tunnels;
   an air inlet for receiving unconditioned air;
   a thermal exchange assembly operable to facilitate thermal exchange between the thermally conditioned heat-transfer fluid and the unconditioned air, wherein the thermal exchange results in the conditioning of the unconditioned air; and
   an air outlet for outputting the conditioned air into the vehicle.

2. The vehicle air comfort system of claim 1, wherein the conditioning comprises cooling the unconditioned air.

3. The vehicle air comfort system of claim 2, wherein the thermal conditioning comprises cooling the heat-transfer fluid, and wherein the thermal exchange comprises the transfer of heat from the unconditioned air to the thermally conditioned heat transfer fluid.

4. The vehicle air comfort system of claim 1, wherein the conditioning comprises heating the unconditioned air.

5. The vehicle air comfort system of claim 4, wherein the thermal conditioning comprises heating the heat-transfer fluid, and wherein the thermal exchange comprises the transfer of heat from the thermally conditioned heat transfer fluid to the unconditioned air.

6. The vehicle air comfort system of claim 1, wherein the system further comprises a plurality of fins operable to dissipate thermal energy from the thermoelectric cooler.

7. The vehicle air comfort system of claim 1, wherein the system further comprises a thermoelectric cooler exhaust for outputting dissipated thermal energy from the thermoelectric cooler.

8. The vehicle air comfort system of claim 1, wherein the thermal exchange assembly comprises:
   a fluid inlet for receiving the thermally conditioned heat transfer fluid;
   a body for facilitating thermal exchange between the thermally conditioned heat transfer fluid and the unconditioned air; and
   a fluid outlet for outputting the heat transfer fluid after the thermal exchange.

9. The vehicle air comfort system of claim 1, wherein the thermal exchange assembly is a radiator.

10. The vehicle air comfort system of claim 1, wherein the system further comprises a tubing network operable to place the flow tunnels in fluid communication with the thermal exchange assembly.

11. The vehicle air comfort system of claim 10, wherein the tubing network is a closed-loop circuit.

12. The vehicle air comfort system of claim 10, wherein the tubing network further comprises a pump for facilitating transport of the heat-transfer fluid through the tubing network.

13. The vehicle air comfort system of claim 1, wherein the heat-transfer fluid is a coolant.

14. The vehicle air comfort system of claim 1, wherein the system further comprises one or more fans for facilitating movement of conditioned or unconditioned air.

15. The vehicle air comfort system of claim 14, wherein the one or more fans move unconditioned air from the air inlet to the thermal exchange assembly.

16. The vehicle air comfort system of claim 14, wherein the one or more fans move conditioned air from the thermal exchange assembly to the air outlet.

17. The vehicle air comfort system of claim 1, wherein the system further comprises a pre-cool unit for pre-cooling the unconditioned air.

18. The vehicle air comfort system of claim 1, wherein the system further comprises one or more filter units for filtering the conditioned or unconditioned air.

19. The vehicle air comfort system of claim 1, wherein the system further comprises an evaporator unit for humidifying the conditioned or unconditioned air.

20. The vehicle air comfort system of claim 1, wherein the vehicle is a truck.

* * * * *